United States Patent Office 3,395,168
Patented July 30, 1968

3,395,168
SILPHENYLENE SILOXANES
William A. Piccoli, Pittsburgh, Pa., assignor to Dow Corning Corporation, Midland, Mich., a corporation of Michigan
No Drawing. Filed Feb. 8, 1965, Ser. No. 431,215
6 Claims. (Cl. 260—448.2)

ABSTRACT OF THE DISCLOSURE

Novel triorganosilyl endblocked polymers are shown containing a silphenylene group for improved thermal stability and useful as heat transfer fluids. An illustrative compound being:

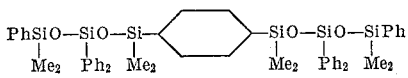

This invention relates to triorganosilyl endblocked polymers containing a silphenylene group.

It is the object of this invention to prepare novel compositions of matter of improved thermal stability which are useful as lubricants and heat transfer fluids. Other objects and advantages will be apparent from the following description.

This invention relates to compositions of the formula

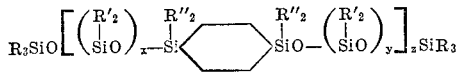

in which R, R' and R" are each of the group phenyl and methyl radicals, $x$ and $y$ are each integers from 1 to 4 inclusive and $z$ is an integer from 1 to 3 inclusive.

The products of this invention can be prepared by condensing acetoxy silanes of the formula $R_3SiOAc$ with diols of the formula

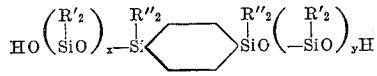

in the presence of an acid acceptor such as triethylamine. This reaction is best carried out in solution in a solvent such as toluene and at a temperature of about 30 to 35° C. If desired, the reaction can also be carried out by reacting chlorosilanes of the formula $R_3SiCl$ with the above diols in the presence of acid acceptors such as pyridine, picoline or the like. This reaction also proceeds at relatively low temperatures.

The diols employed herein are prepared in accordance with the method set forth in the copending application of Robert H. Leitheiser entitled "Silphenylene Containing Building Blocks" Ser. No. 431,160, filed Feb. 8, 1965, the disclosure of which is hereby incorporated by reference.

In preparing the endblocked polymers of this invention the value of $z$ will depend upon the relative mol ratios of the triorganosilane and the diol. By varying the ratio, one can obtain polymers ranging from those in which $z$ is 1 up to 3. It should be understood that in many preparations a mixture of polymers is obtained in which case the above formulae represents average formulae.

The following examples are illustrative only and should not be construed as limiting the invention which is properly delineated in the appended claims. In the examples, Me represents the methyl radical and Ph the phenyl radical.

Example 1

23.3 g. of phenyldimethylacetoxysilane and 112.1 g. of p-bis(3-hydroxy-1,1-dimethyl-3,3-diphenylsiloxanyl) benzene were dissolved in 148 ml. of toluene in a flask protected from moisture. 12.1 g. of triethylamine was then added with stirring over a 5 minute period during which time the temperature rose from 24 to 30° C. After 4.3 hours, the reaction was essentially complete and the temperature reached a maximum of 33° C. The mixture was stirred overnight and then washed to remove the triethylamine acetate.

At this point the product contained unreacted silicon-bonded hydroxyls. 113.3 g. of the product was mixed with 56 ml. of benzene and 1.13 g. of tetramethylguanidine di-2-ethylhexoate and refluxed under a water trap to azeotropically remove water. Most of the water came over in the first three hours. The solution was diluted with 250 cc. of benzene and washed with water to remove the catalyst. The benzene solution was dried over sodium sulfate, filtered and the solvent then removed at reduced pressure at a maximum temperature of 200° C. at 1–2 mm. The product was a fluid having a viscosity of 53,500 cs. at 25° C., a refractive index at 25° of 1.5728 and a density at 25° of 1.111. This polymer had the average formula

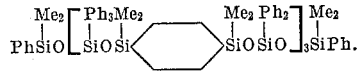

Example 2

Using the procedure of Example 1, 54.4 g. of phenyldimethylacetoxysilane and 87.2 g. of p-bis(2-hydroxy-1,1-dimethyl-3,3-diphenyldisiloxynyl)benzene were reacted in 170 ml. of toluene in the presence of 28.3 g. of triethylamine. After purification the product was a crystalline material melting at 59 to 63° C. which after two recrystallizations from 99% isopropanol had a melting point of 63 to 64° C. This material had the formula

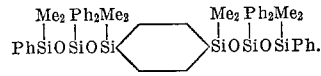

Example 3

The procedure of Example 2 was repeated except that the acetoxysilane employed was methyldiphenylacetoxysilane. The crystalline product obtained had the formula

Example 4

33.65 g. of

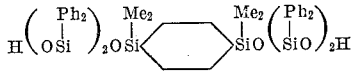

12.82 g. of phenyldimethylacetoxy silane and 53 ml. of toluene were mixed and stirred as 6.68 g. of triethylamine was added dropwise over a period of 5 minutes. The mixture was heated and stirred at a temperature of 30–33° C. for six hours. The product was diluted with 25 ml. of toluene and washed with water til neutral. The product was dried and the solvent removed at a maximum temperature of 175° C. at 1–2 mm. The product was a clear, viscous fluid of the formula

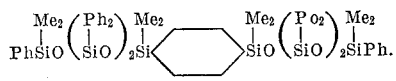

What is claimed is:
1. A composition of the formula

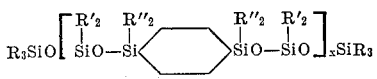

in which R, R' and R" are each selected from the group consisting of phenyl and methyl radicals and $x$ is an integer from 1 to 3 inclusive.

2. A compound of the formula

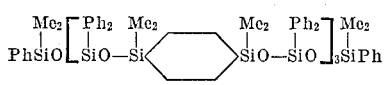

in which Me is the methyl radical and Ph the phenyl radical.

3. A compound of the formula

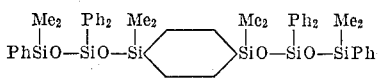

in which Me is the methyl radical and Ph the phenyl radical.

4. A compound of the formula

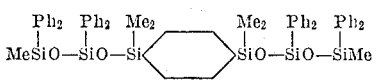

in which Me is the methyl radical and Ph the phenyl radical.

5. A composition of the formula

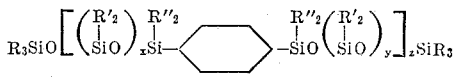

in which R, R' and R'' are each selected from the group consisting of phenyl and methyl radicals, $x$ and $y$ are each integers from 1 to 4 inclusive, and $z$ is an integer from 1 to 3 inclusive.

6. A composition of the formula

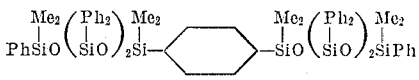

in which Me is the methyl radical and Ph is the phenyl radical.

References Cited
UNITED STATES PATENTS

| | | | |
|---|---|---|---|
| 3,202,634 | 8/1965 | Merker | 260—448.2 XR |
| 3,332,973 | 7/1967 | Merker | 260—448.2 |
| 3,336,352 | 8/1967 | Omietanski | 260—448.2 |

TOBIAS E. LEVOW, *Primary Examiner.*

P. F. SHAVER, *Assistant Examiner.*